United States Patent
Van Tassel

(10) Patent No.: US 9,546,759 B2
(45) Date of Patent: Jan. 17, 2017

(54) SYSTEM AND METHOD FOR TRANSFERRING NATURAL GAS FOR UTILIZATION AS A FUEL

(71) Applicant: Gary W. Van Tassel, Seaford, VA (US)

(72) Inventor: Gary W. Van Tassel, Seaford, VA (US)

(73) Assignee: Argent Marine Management, Inc., Incline Village, NV (US)

( * ) Notice: Subject to any disclaimer, the term of this patent is extended or adjusted under 35 U.S.C. 154(b) by 499 days.

(21) Appl. No.: 13/840,732

(22) Filed: Mar. 15, 2013

(65) Prior Publication Data
US 2013/0213500 A1    Aug. 22, 2013

Related U.S. Application Data

(63) Continuation-in-part of application No. 13/366,305, filed on Feb. 4, 2012.

(51) Int. Cl.
    *F16K 17/14*     (2006.01)
    *F17C 13/12*     (2006.01)
    (Continued)

(52) U.S. Cl.
    CPC ............ *F17C 13/12* (2013.01); *B61C 17/02* (2013.01); *F16L 11/18* (2013.01); *F16L 37/28* (2013.01);
    (Continued)

(58) Field of Classification Search
    CPC ........ F16K 17/14; B63B 27/34; F17C 13/004; F17C 13/12; F16L 55/1015; Y02T 70/90; Y02T 70/5263; Y02T 70/34; B63J 2099/003; B60K 15/013
    (Continued)

(56) References Cited

U.S. PATENT DOCUMENTS 2,795,937 A    6/1957  Sattler et al.
3,345,970 A *  10/1967 De Long ............... B63B 35/665
                                                            114/248
(Continued)

OTHER PUBLICATIONS

Written Opinion for counterpart International Application No. PCT/US2014/027267 by International Searching Authority, dated Jul. 28, 2014.
(Continued)

*Primary Examiner* — Kevin Lee
*Assistant Examiner* — P. Macade Nichols
(74) *Attorney, Agent, or Firm* — Amster, Rothstein & Ebenstein, LLP

(57) ABSTRACT

Natural gas is produced when LNG that is contained in an insulated LNG cargo tank(s) of a non-self-propelled LNG carrier (i.e., a barge) evaporates as a result of heat leakage through the walls of the insulated cargo tank(s). The natural gas is transferred from the barge to a tugboat or a towboat that is equipped with natural gas burning engines through a flexible gas transfer assembly so that the tugboat is powered by the natural gas fuel. The pressure in the cargo tank(s) on the barge is, therefore, effectively managed to prevent or substantially reduce the buildup of pressure within the LNG cargo tank(s). The LNG can then be contained within the LNG cargo tank(s) for an appropriate period of time and can be delivered at an appropriate and acceptable equilibrium pressure and temperature.

37 Claims, 13 Drawing Sheets

Section "A-A"

(51) Int. Cl.
*F17C 13/00* (2006.01)
*B61C 17/02* (2006.01)
*F16L 11/18* (2006.01)
*F16L 37/28* (2006.01)
*F16L 55/10* (2006.01)
*B63B 27/34* (2006.01)
*B60K 15/01* (2006.01)
*B63J 99/00* (2009.01)

(52) U.S. Cl.
CPC .......... *F16L 55/1015* (2013.01); *F17C 13/004* (2013.01); *B60K 15/013* (2013.01); *B63B 27/34* (2013.01); *B63J 2099/003* (2013.01); *F16L 2201/30* (2013.01); *Y02T 70/34* (2013.01); *Y02T 70/5263* (2013.01); *Y10T 137/8326* (2015.04); *Y10T 137/8807* (2015.04)

(58) Field of Classification Search
USPC ... 137/557, 615, 68.11; 141/387; 414/137.9, 414/138.2; 285/95, 96, 106, 47; 62/45.1, 62/53.1
See application file for complete search history.

(56) References Cited

U.S. PATENT DOCUMENTS

| | | | |
|---|---|---|---|
| 4,142,767 A * | 3/1979 | Karl et al. | 439/24 |
| 6,623,043 B1 | 9/2003 | Pollack | |
| 6,938,643 B2 * | 9/2005 | Pollack | 137/615 |
| 7,047,899 B2 | 5/2006 | Laurilehto et al. | |
| 8,375,876 B2 | 2/2013 | Van Tassel | |
| 2004/0123899 A1 * | 7/2004 | Turvey | 137/68.15 |
| 2006/0053806 A1 | 3/2006 | Tassel | |
| 2010/0000252 A1 | 1/2010 | Morris et al. | |
| 2010/0263389 A1 | 10/2010 | Bryngelson et al. | |
| 2012/0324910 A1 | 12/2012 | Shete et al. | |

OTHER PUBLICATIONS

International Search Report for counterpart International Application No. PCT/US2014/027267, dated Jul. 28, 2014.

* cited by examiner

SYSTEM AND METHOD FOR TRANSFERRING NATURAL GAS FOR UTILIZATION AS A FUEL

CROSS-REFERENCE TO RELATED APPLICATIONS

This application is a continuation-in-part of U.S. patent application Ser. No. 13/366,305, filed on Feb. 4, 2012, the contents of which are incorporated herein by reference in their entirety.

FIELD OF THE INVENTION

The present invention generally relates to the transportation of a cryogenic liquid such as LNG. More particularly, the present invention relates to a system and a method by which a gas provided by the evaporation of a portion of the cryogenic liquid is transferred, in a sound operating manner and in compliance with all governing international regulations, from the storage tank(s) of a land or marine vehicle for the purpose of being used as fuel by the gas-burning engines of the another land or marine vehicle.

BACKGROUND OF THE INVENTION

Natural gas, when cooled to approximately −260° F., changes phase from a gas to a liquid, thus "Liquefied Natural Gas" or "LNG." In this phase change process, the volume required to hold a specific quantity of natural gas is reduced by approximately 600 times, thus making it possible to transport significant, and economic quantities of natural gas over great distances from source to market.

LNG is a boiling cryogen that is usually stored at atmospheric temperature and pressure equilibrium conditions. Unlike other gaseous fuels such as propane and butane, which can be stored as a liquid at atmospheric temperatures by allowing the liquid and the gas in the tank to reach a stable equilibrium vapor pressure for any given atmospheric temperature, LNG (the principal component of which is methane) cannot be maintained as a liquid under pressure at atmospheric temperatures due to its low critical point pressure (673+ psia for methane), critical point temperature (−115.8° F. for methane), and very high vapor pressures. Accordingly, LNG is stored and is transported in heavily insulated tanks.

Although the amount of heat that reaches the LNG is significantly reduced by the tank insulation, the heat inflow to the LNG cannot be entirely eliminated. Consequently, a quantity of cold natural gas vapor (referred to as "boil off vapor" or "boil off") is constantly being generated and must be removed from the tank and must be either disposed of or re-liquefied in order to prevent an overpressure condition of the LNG tank. Specifically, the resulting boil off is either: (1) vented to the atmosphere (which venting is limited, by regulation, as an emergency/extraordinary procedure because natural gas is flammable and is a significant greenhouse gas); (2) heated, pressurized, and sent to a gas distribution system (in the case of land-based LNG tanks); (3) re-liquefied and returned to the tank as LNG; (4) flared as waste gas; (5) burned in propulsion machinery as fuel (in the case of liquefied natural gas carriers, or "LNGCs"); or (6) contained in the LNG tank for a finite period of time by allowing the vapor space of the tank to increase in pressure as the LNG continues to boil. This latter option can only be sustained for a relatively short period of time, typically limited to days (generally less than a month).

Historically, LNG has been utilized to effect the transportation of natural gas from sources in remote regions of the world to end users in population centers where demand for energy, particularly natural gas, is continually increasing. LNG has also been utilized for the purpose of efficiently storing natural gas during periods of low natural gas demand for later use during periods of high natural gas demand, i.e., so called "peak shaving" operations.

Recently, LNG is increasingly being utilized as a feedstock for generating and industrial facilities and as a transportation fuel for both land and marine vehicles. Natural gas is an attractive transportation fuel from the perspectives of long term availability, reduced emissions, and cost advantage over traditional distillate fuels. However, to achieve an equivalent energy level, the size of the space needed to house the required quantity of LNG is substantially greater than the size of the space needed to house the required quantity of a light distillate fuel, such as diesel fuel.

The increased demand for and use of LNG is creating a need for additional waterborne strategies for transportation of LNG to end-user distribution facilities. The marine transportation and distribution of LNG, whether in inland rivers and waterways or on open ocean coastal routes, is often most efficiently and economically accomplished by systems that utilize tugboats and barges.

In the case of the only LNG barge to be built (see Donald W. Oakley, *World's First Commercial LNG Barge*, OCEAN INDUSTRY, November 1973, at 29-32), the LNG boil off was allowed to accumulate in the LNG tank by allowing the pressure in the tank to increase over time. The LNG tanks and the insulation system were designed to contain the boil off for a period of 45 days before the LNG tank relief valves would open due to overpressure, thus releasing the natural gas to the atmosphere.

A significant problem with this approach is that the LNG itself will rise in temperature to reach the equilibrium temperature that corresponds to the pressure of the LNG tank. Specifically, as the LNG tank pressure rises, the LNG temperature will also rise. If this warm LNG is then pumped into an LNG storage tank that is at a lower/normal pressure (i.e., a pressure that is slightly above atmospheric pressure, e.g., approximately +100 millibars), the warm LNG will rapidly vaporize and will release large volumes of cold natural gas as the LNG is cooled by evaporative processes until the LNG again reaches an equilibrium temperature that corresponds to the new tank pressure. This is unacceptable, since an LNG receiving terminal will be unable to dispose of the excess natural gas and tank overpressure is likely, with subsequent release of natural gas to the atmosphere. Even a slightly warmer LNG can be problematic due to the phenomenon of "roll-over" within the storage tank resulting in rapid and uncontrolled LNG vaporization.

There is also an increased safety risk associated with LNG at equilibrium conditions that are above atmospheric pressure should the LNG be accidentally released. At higher pressure equilibrium conditions, the LNG will vaporize at an increased rate, thereby significantly increasing thermal radiation risks should the vapor cloud ignite prior to dispersing.

Self-propelled LNGCs use the boil off as propulsion fuel in the ship's engines and are, therefore, able to maintain proper LNG tank pressure and LNG temperature. In the case of a barge, however, this approach is not an option because a barge does not have propulsion engines.

The LNG barge referred to above solved this problem of the increasing LNG temperature with time by cooling the LNG in a controlled fashion during the discharge operation, prior to the LNG being pumped into land-based tanks. This process was described by Mr. Oakley in the November 1973 OCEAN INDUSTRY article and will not be repeated herein. Such cooling process, depending on the length of time that the LNG is aboard the barge and other factors, can result in discharge delays and considerable additional expense. It also significantly complicates the discharging operation. Finally, the added LNG cooling equipment that is required is costly to purchase and is expensive to maintain.

U.S. Pat. No. 7,047,899 to Laurilehto et al. teaches the concept of using electric generator sets that are fitted to a barge and use natural gas as fuel, thereby allowing cargo tank boil off to be consumed in the engines, thereby allowing for control of the pressure of the cargo tanks. Electrical propulsion power for a tugboat is transferred to the tugboat from the barge by electrical cables. U.S. Patent Application Publication No. 2006/0053806 to Van Tassel also teaches several approaches for effectively managing LNG cargo tank boil off and, therefore, LNG cargo tank pressure.

An article entitled *LNG-Power Is the Time Now?* published in the February 2011 issue of MARINE NEWS, teaches the concept of using an LNG fuel barge combined with a typical inland towboat to provide natural gas fuel to the towboat as there is generally insufficient space on the towboat to house a sufficient quantity of LNG fuel. This article describes transferring LNG to the towboat in liquid, cryogenic form and processing and re-gasifying the liquid gas on the towboat, so that the engines of the towboat can make use of the gas as fuel. Such transfer of cryogenic gas is extremely hazardous owing to both the cryogenic temperatures involved and the increased likelihood and consequences of leakage.

FIG. 5 of U.S. Pat. No. 2,795,937 to Sattler et al. ("Sattler") discloses the transfer of the boil off gas from cargo tanks on a barge to a tugboat that tows (in this case, pulls) the barge. In FIG. 5, Sattler discloses that the boil off gas is to be transferred from the barge to the tugboat through a flexible conduit or pipe. The boil off gas is then to be used as fuel in the tugboat's propulsion power plant, in this case a steam boiler, in much the same manner as in a self-propelled ship (e.g., a LNGC). By consuming the boil off in the tugboat's propulsion system, the LNG cargo tank pressure can, therefore, be maintained at near atmospheric pressure.

An examination of Sattler reveals, however, that Sattler fails to recognize the many significant technical, operational, and regulatory problems that would prevent the embodiment shown in FIG. 5 from ever becoming operative. (In fact, to the best of the inventor's extensive knowledge of this field, such an embodiment has never been reduced to practice.) The most significant of these problems is the high likelihood that the flexible conduit or pipe would be damaged or severed by the unrestricted relative motion and resulting forces between the barge and tugboat, which is further aggravated by the typical distances (often in excess of 600 feet) that a barge is towed behind a tugboat. As a consequence, natural gas would be released to the atmosphere, creating a potentially hazardous situation due to the release of significant quantities of natural gas. At a minimum, this will contribute adversely to greenhouse gas emissions. Additional problems that Sattler fails to recognize include: (1) the flexible conduit or pipe would have to be able to accommodate motion in all degrees of freedom, as a tugboat and barge have complete freedom of motion relative to each other; (2) natural gas would be released to the atmosphere when connecting and disconnecting the flexible conduit or pipe; (3) you would have to find a way of purging the flexible conduit or pipe with inert gas prior to connecting or disconnecting the flexible conduit or pipe; (4) there does not appear to be any provision for emergency breakaway and disconnection of the flexible conduit or pipe should the tugboat need to separate from the barge or should the towline part, which is not uncommon; (5) there does not appear to be any provision for secondary containment of natural gas should the flexible conduit or pipe fail or leak; (6) there does not appear to be any provision to detect the leakage of natural gas should the flexible conduit or pipe develop a leak, or to detect leakage at the connections of the flexible conduit or pipe; and (7) there is no automatic shutdown of the natural gas transfer from the barge to the tugboat upon failure or leakage of the flexible conduit or pipe or its connections.

SUMMARY OF THE INVENTION

It has now been found that the foregoing problems are solved in the form of several separate, but related, aspects. A flexible gas transfer assembly is connected using connectors that incorporate self-closing valves in both halves of the connectors, so that natural gas fuel is contained within the gas transfer assembly when the assembly is disconnected, thereby eliminating the need to purge the gas transfer assembly with inert gas prior to disconnecting it. Additionally, little to no natural gas fuel is released to the atmosphere due to the self-sealing nature of the connectors.

In exemplary embodiments, an emergency breakaway connector separates the gas transfer assembly from either a tugboat or a barge, depending on the particular configuration, should the gas transfer assembly be subject to an excess axial load. (The emergency breakaway connector is designed to separate at a specific load.) Thus, if the tugboat is required to release from the barge in an emergency situation, the coupler pins that connect the tugboat to the barge are retracted, and the tugboat backs out of the barge notch. The axial load placed on the fuel gas transfer assembly as a result of the tugboat exiting the notch causes the emergency breakaway coupling halves to separate, thereby disconnecting the gas transfer assembly and allowing the tugboat to freely exit the barge notch. The emergency breakaway connector also incorporates self-closing valves, trapping any natural gas in the gas transfer assembly and preventing release of natural gas.

The gas transfer assembly includes a flexible inner transfer hose and a flexible outer jacket that envelops the inner transfer hose. The jacket space between the inner transfer hose and the outer jacket is purged and pressurized with a gas that will not support combustion, i.e., an inert gas. The jacket space is maintained at a pressure that is above the maximum pressure of the natural gas fuel in the inner transfer hose. If the inner transfer hose develops a leak, the higher pressure inert gas in the jacket space will leak into the inner transfer hose that carries the natural gas fuel. This leakage will result in a drop in the pressure in the jacket space, which will in turn cause a pressure switch to trip, thus providing an alarm and a shutdown signal that secure the transfer of the natural gas fuel in a safe manner. Likewise, a leak in the outer jacket will cause the inert gas to leak out, thereby causing a drop in the pressure in the jacket space and also causing a system shutdown. In this manner, any failure of the gas transfer assembly will result in the flow of natural gas fuel being shut down automatically.

In alternative embodiments of the present invention, the gas transfer assembly can be replaced with a gas transfer pipe that includes a plurality of pipe segments that are interconnected using swivel joints to provide the gas transfer pipe with the required flexibility. The pipe segments may be rigid, and the swivel joints may be sealed.

Another potential source of natural gas leakage is the connectors, both the normal quick connect/disconnect connectors and the emergency breakaway connectors, that are used to couple the gas transfer assembly to the tugboat and to the barge. Since natural gas is lighter than air at ambient temperature conditions, leakage of natural gas at the connectors can be detected by placing hoods or shields over the connectors and fitting the hoods or shields with gas detector sensors. Even minor leakages of natural gas that would be undetectable by other means will be detected by the gas detectors and will cause alarms and system shutdowns. The likelihood of a natural gas leak going undetected and creating a safety issue on the tugboat or the barge is, therefore, reduced to acceptable and manageable levels consistent with the guiding concepts and principles of the governing international regulations for these types of vessels.

In alternative embodiments of the present invention, a containment unit can be fitted closely around the connectors, and air that flows through vent openings in the containment unit directs any leakage of natural gas within the containment unit into a vented space between the inner and outer walls of a double-wall gas pipe which goes to the engine room of the tugboat, where a gas detector can detect the leakage and cause alarms and system shutdowns.

In accordance with the embodiments of the invention described below, natural gas at ambient temperatures can be transferred from a barge to a tugboat in an extremely safe manner. In such application, the fuel barge with LNG tanks is also fitted with the necessary processing equipment to re-gasify the LNG and heat the resulting natural gas to ambient conditions.

Although the presently preferred embodiments of the present invention described below are directed to the transfer of natural gas from a barge to a tugboat, the present invention is not to be understood as being limited to marine vessels. It should be understood that the present invention applies to any type of vehicle, including but not limited to marine vessels and land vehicles (e.g., railroad locomotives, railroad cars, and trucks).

BRIEF DESCRIPTION OF THE DRAWINGS

Advantages of the present invention may become apparent to those skilled in the art with the benefit of the following detailed description and upon reference to the accompanying drawings, in which.

DETAILED DESCRIPTION OF PREFERRED EMBODIMENTS

Definitions of certain terms used in this specification are as follows:

Vehicle—any means in or by which something is carried or conveyed; a means of conveyance or transport. As used herein, the term "vehicle" includes but is not limited to marine vessels (e.g., ships, tugboats, towboats, barges, and articulated tug/barges ("AT/Bs")) and land vehicles (e.g., railroad locomotives, railroad cars, and trucks).

Self-propelled vessel—a marine vessel that possesses permanently installed capability to propel itself at sea, i.e., a "ship."

Non-self-propelled vessel—a marine vessel that is without a permanently installed capability to propel itself at sea, i.e., a "barge." A "self-propelled" vessel that, for whatever reason, is not using its installed capability for propulsion is not, as defined herein, a "non-self-propelled" vessel.

LNG—liquefied natural gas.

LNGC—a self-propelled LNG carrier of ship form.

LNG Barge—a non-self-propelled LNG carrier.

AT/B—a vessel arranged in an articulated tug/barge configuration, wherein propulsion of a non-self-propelled barge is provided by a separate tugboat that is connected to the barge by a pinned connection(s) that restrict motion in all degrees of freedom except for pitch.

AT/B LNGC—an LNG carrier arranged in an articulated tug/barge (AT/B) configuration, wherein propulsion of the barge is provided by a separate tug that is connected to the barge by a pinned connection(s) that restrict motion in all degrees of freedom except for pitch.

Towboat—an inland river vessel arranged for pushing barges on inland waterways and rivers.

Figure 1:
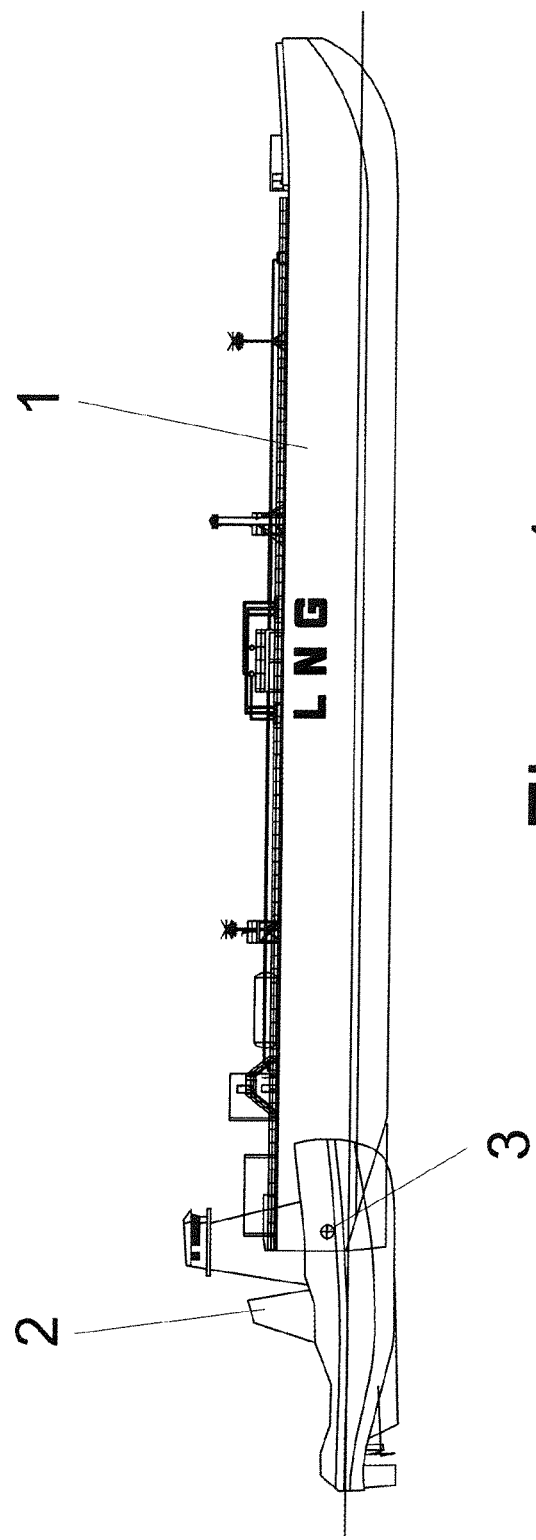
FIG. 1 is a profile view of an exemplary articulated tug/barge ("AT/B") liquefied natural gas carrier ("LNGC").
Figure 2:
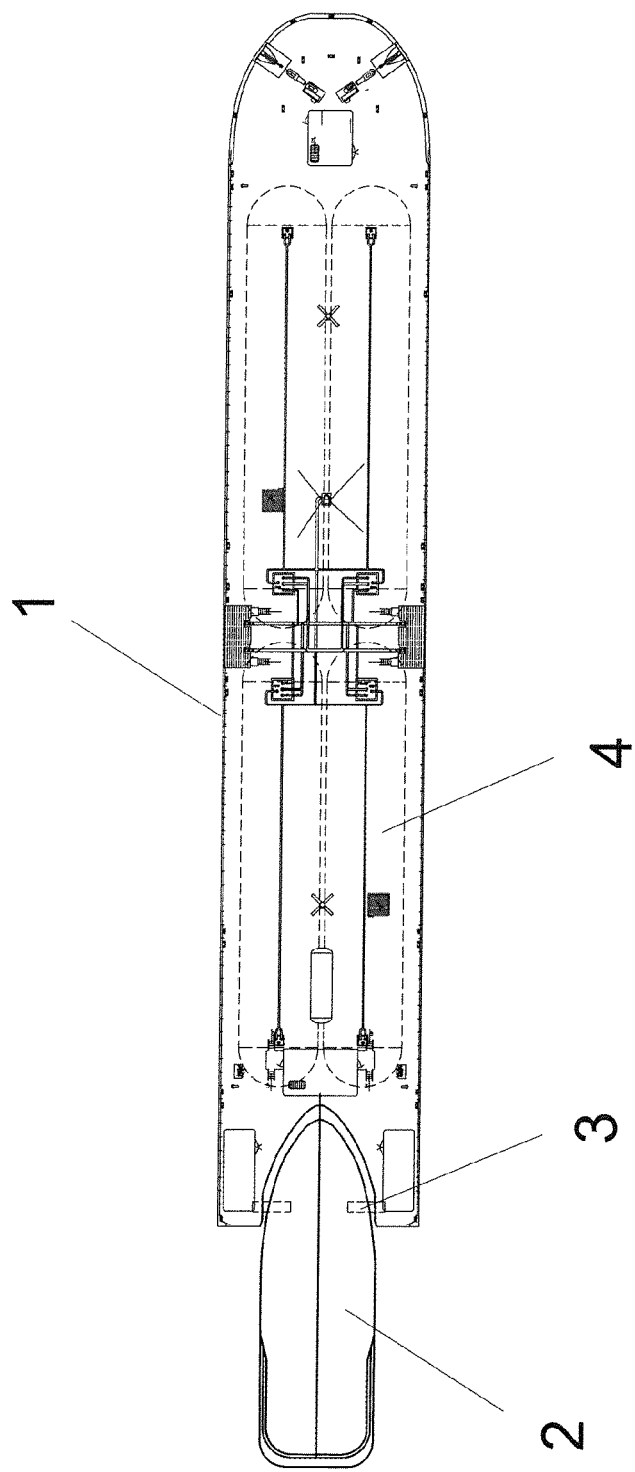
FIG. 2 is a plan view of the AT/B LNGC shown in FIG. 1.

Referring to FIGS. 1 and 2, an exemplary AT/B LNGC is formed by combining a barge portion 1 with a tugboat portion 2. The barge 1 and tugboat 2 are coupled together with coupling pins 3 such that relative motion is restricted in all degrees of freedom except for pitch. In the AT/B LNGC shown in FIGS. 1 and 2, the barge 1 includes one or more LNG cargo tanks 4 for storing LNG cargo during transport. As shown in FIG. 2, the barge 1 has four LNG cargo tanks. However, it should be understood that the number and size of the cargo tanks included in the barge 1 in no way limits the scope of the invention as defined in the appended claims.

Figure 3:
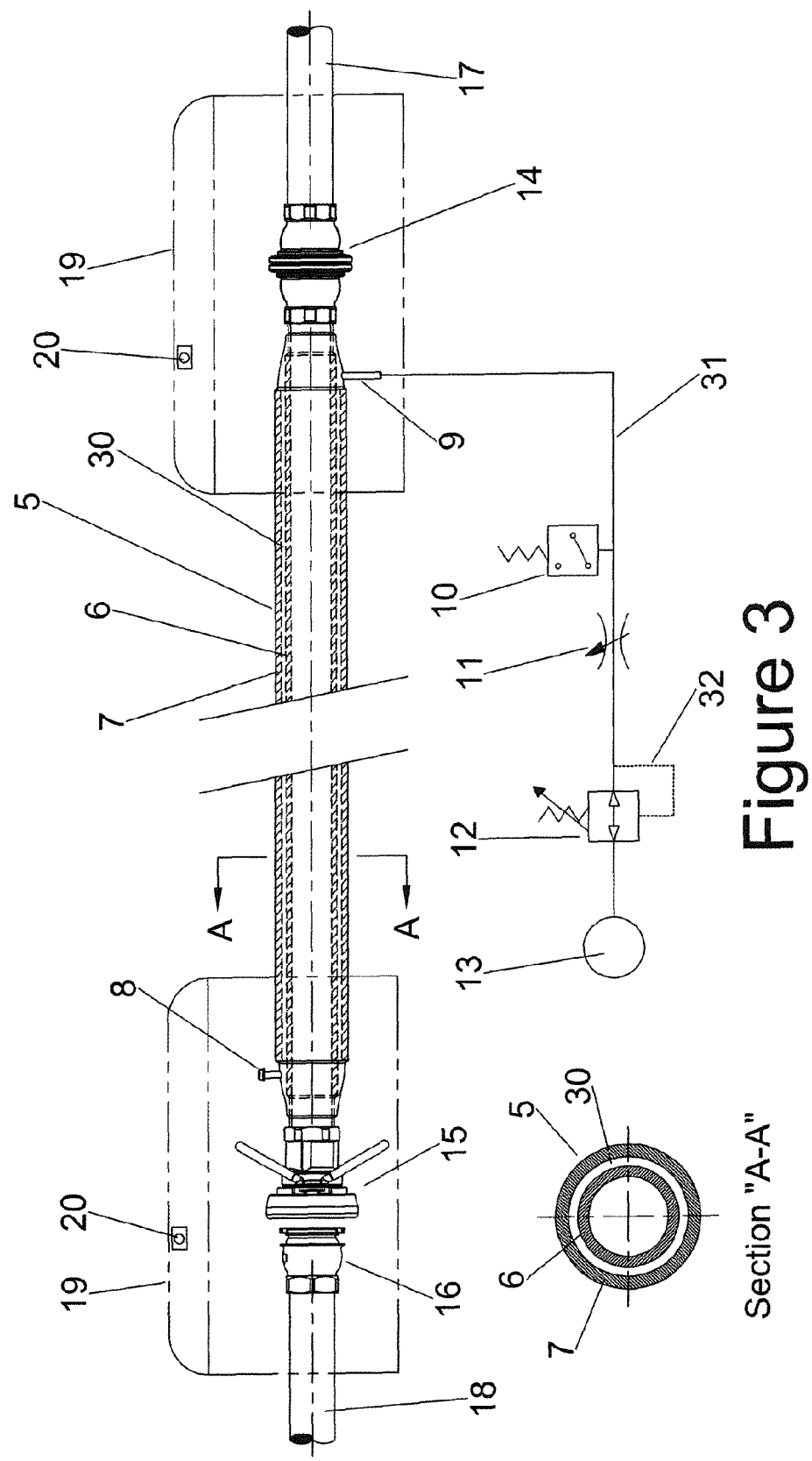
FIG. 3 shows an embodiment in accordance with the present invention.

FIG. 3 illustrates an exemplary embodiment in which ambient temperature natural gas (i.e., the boil off from the LNG stored in the cargo tanks 4 of the barge 1) is transferred from a supply source 17 from the LNG fuel system on the barge 1 through a fuel gas transfer assembly 5 to the supply piping 18 for the natural gas fuel system of the tugboat 2, where the natural gas will be used as the vessel fuel for the natural gas fueled engines that power the tugboat 2.

In accordance with an embodiment of the present invention, a fuel gas transfer assembly 5 includes a flexible gas transfer assembly that is suitable for handling ambient temperature natural gas (e.g., LNG boil off) at the required pressure and is suitable for the specific environment in which it is used (e.g., a marine environment). The fuel gas transfer assembly 5 includes a flexible inner transfer hose 6 that is enveloped by a flexible outer jacket 7. In a preferred embodiment, the inner transfer hose 6 is a stainless steel, corrugated hose (i.e., a Bellows hose). In alternative embodiments, the inner transfer hose 6 may be made of other materials, including regular steel, aluminum, or wire-reinforced rubber, and it should be understood that the material from which the flexible inner transfer hose 6 is made in no way limits the scope of the invention as defined in the appended claims. The inner transfer hose 6 need not even be a hose, but can be any means of transferring the natural gas that is flexible and is compatible with the required LNG pressures and with the surrounding environment.

In accordance with an embodiment of the present invention, a jacket space 30 between the outer jacket 7 and the inner transfer hose 6 is filled with a gas that does not support combustion in the event that natural gas leaks into the jacket space 30 from the inner transfer hose 6. In a preferred embodiment, the jacket space 30 is filled with an inert gas, preferably nitrogen. However, in alternative embodiments, the jacket space 30 can be filled with other gases that will not support combustion, including but not limited to carbon dioxide, argon, or helium. Here again, the choice of the particular gas that fills the jacket space 30 in no way limits the scope of the invention as defined in the appended claims.

In accordance with an embodiment of the present invention, the inert gas that fills the jacket space 30 is held at a pressure that is higher than the maximum pressure of the natural gas that is within the inner transfer hose 6. The inert gas is admitted to the jacket space 30 of the fuel gas transfer assembly 5 through a connection 9 located at one end of the fuel gas transfer assembly 5. A purge connection 8 is provided at the other end of the fuel gas transfer assembly 5 and can be opened to allow the atmosphere within the jacket space 30 to be completely filled with inert gas. Once purging is complete, the purge connection 9 is closed and the pressure within the jacket space 30 is maintained at a pressure that is above the pressure of the natural gas contained within the inner transfer hose 6. In an exemplary embodiment, the maximum pressure of the natural gas that is within the inner transfer hose 6 is typically 5 bars, and the jacket space 30 is held at a pressure of 6 bars.

In a preferred embodiment, the inert gas, such as nitrogen, is provided from an inert gas source 13 to the fuel gas transfer assembly 5 through a supply line 31 and the connection 9. A pressure reducing valve 12 is provided in the supply line 31 to deliver the inert gas to the jacket space 30 at the desired pressure. Additionally, the pressure reducing valve 12 can optionally use a feedback loop 32 to monitor the pressure in the inner transfer hose 6 so as to maintain the desired pressure differential between the inner transfer hose 6 and the outer jacket 7 in the jacket space 30. A flow restrictor 11 is fitted to limit the flow rate of the inert gas to the jacket space 30 to ensure that the pressure in the jacket space 30 drops should a leak develop. A pressure switch 10 is fitted to monitor the pressure of the inert gas in the supply line 31. If this pressure drops below a predetermined limit, the pressure switch 10 closes, initiating a shutdown signal to terminate the flow of natural gas as well as sounding an alarm to alert operating personnel.

In accordance with an embodiment of the present invention, the fuel gas transfer assembly 5 provides an increased level of safety by ensuring that a leak in the inner transfer hose 6 is captured within the outer jacket 7, while simultaneously providing for the shutdown of the transfer of the natural gas fuel from the barge to the tugboat and concomitantly sounding an alarm. Should a leak develop in the inner transfer hose 6, the higher pressure of the inert gas that fills the jacket space 30 between the inner transfer hose 6 and the outer jacket 7 will leak into the inner transfer hose 6. Consequently, the pressure of the inert gas in the supply line 31 will drop, which in turn will cause the pressure switch 10 to close. In a preferred embodiment, the closing of the pressure switch 10 triggers both the generation of warning alarm signals and a shutdown signal that shuts down the supply of natural gas fuel by closing master gas valves. In an exemplary embodiment, the shutdown signal that is triggered by the closing of the pressure switch 10 ties into the emergency shutdown system of the barge 1 to close the master gas valves of barge 1. Further, the outer jacket 7 prevents any release of natural gas to the surrounding atmosphere. Similarly, a loss of pressure in the jacket space 30 could occur due to a failure of the outer jacket 7 or a loss of inert gas supply. In any case, a system shutdown will be triggered, ensuring the required level of safety.

In accordance with an embodiment of the present invention, a self-sealing emergency breakaway coupling 14 is fitted to allow the tugboat 2 to exit from the coupling notch of the barge 1 (see FIGS. 1 and 2) in an emergency situation. Normally the inner transfer hose 6 would be disconnected from the tugboat 2 by releasing a self-sealing quick connect/disconnect connector 15 from the self-sealing mating connection 16 on the tugboat 2. In a preferred embodiment, the emergency breakaway coupling 14 is fitted with self-closing valves (not shown) on both halves of the coupling 14. The coupling 14 is maintained in the normal connected condition by breakaway bolts (not shown) such that when abnormal loads are put on the fuel gas transfer assembly 5, such as would be experienced when the tugboat 2 pulls away from the barge 1 in an emergency without first releasing the fuel gas transfer assembly 5, the bolts break at a prescribed load, thereby allowing the halves of the coupling 14 to separate and the internal self-sealing valves of the coupling 14 to close. By closing, the self-sealing valves prevent any release of natural gas to the atmosphere. Other forms of emergency breakaway couplings could be employed without limiting the scope of the present invention.

In accordance with an embodiment of the present invention, partial shields 19 are fitted over the quick connect/disconnect assembly 15 and the mating connection 16 on the tugboat 2, and over the emergency breakaway coupling 14 on the barge 1. In a preferred embodiment, each partial shield 19 can be moved to provide access to the couplings underneath (i.e., the quick connect/disconnect connector 15 and the mating connection 16, and the emergency breakaway coupling 14) so as not to interfere or inhibit the emergency disconnection of the fuel gas transfer assembly 5. This result can be accomplished by any number of means that are well known to those having ordinary skill in the art, including but not limited to providing the partial shield 19 with a hinge or similar means.

Since the natural gas fuel is at an ambient temperature, it is lighter than air. Therefore, any leakage of the natural gas fuel from the inner transfer hose 6 will rise and will be captured by the partial shield 19 in such a manner that a gas detector 20 located within the partial shield 19 will sense the presence of natural gas before flammable concentrations of the natural gas can accumulate. Upon detection of the natural gas fuel, the gas detector 20 generates a system shutdown signal that is used to cause the flow of the natural gas fuel to be stopped, the fuel system to be put in a safe condition, and an alarm to be sounded. Since the partial shield 19 will concentrate any natural gas fuel at the gas detector 20, any leakage of natural gas fuel will initiate a system shutdown and an audible alarm.

Figure 4:
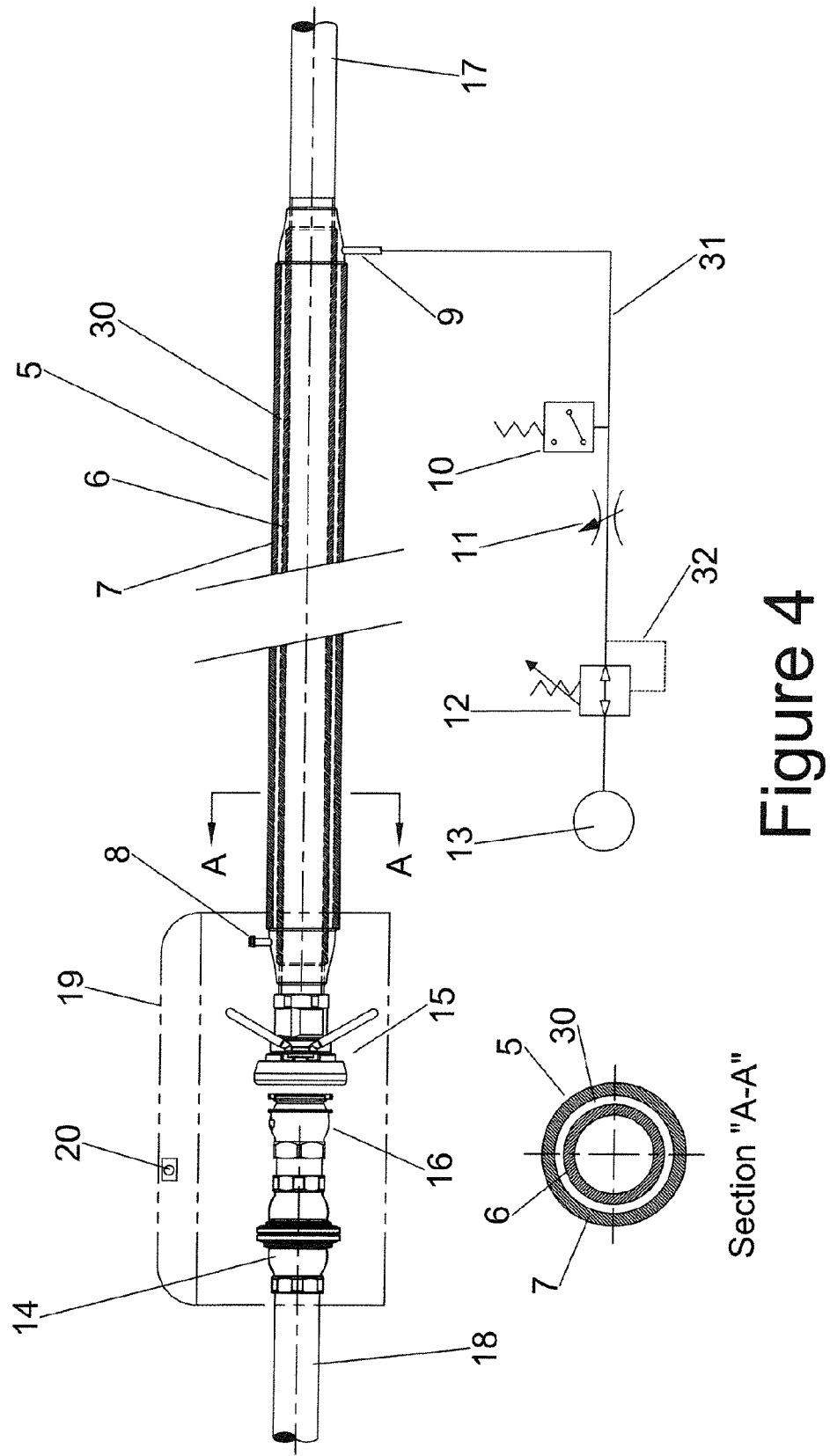
FIG. 4 shows another embodiment in accordance with the present invention.

FIG. 4 shows an alternative to the embodiment shown in FIG. 3. In the alternative embodiment shown in FIG. 4, the emergency breakaway coupling 14 is located on the tugboat 2, adjacent to the mating connection 16 and the quick connect/disconnect connector 15 fitted to the fuel gas transfer assembly 5. By locating the emergency breakaway coupling 14 on the tugboat 2, credible leak sources can be concentrated on the tugboat 2, and the number of partial shields 19 and gas detectors 20 can be reduced to one each versus two each, as illustrated in the embodiment shown in FIG. 3.

Figure 5:
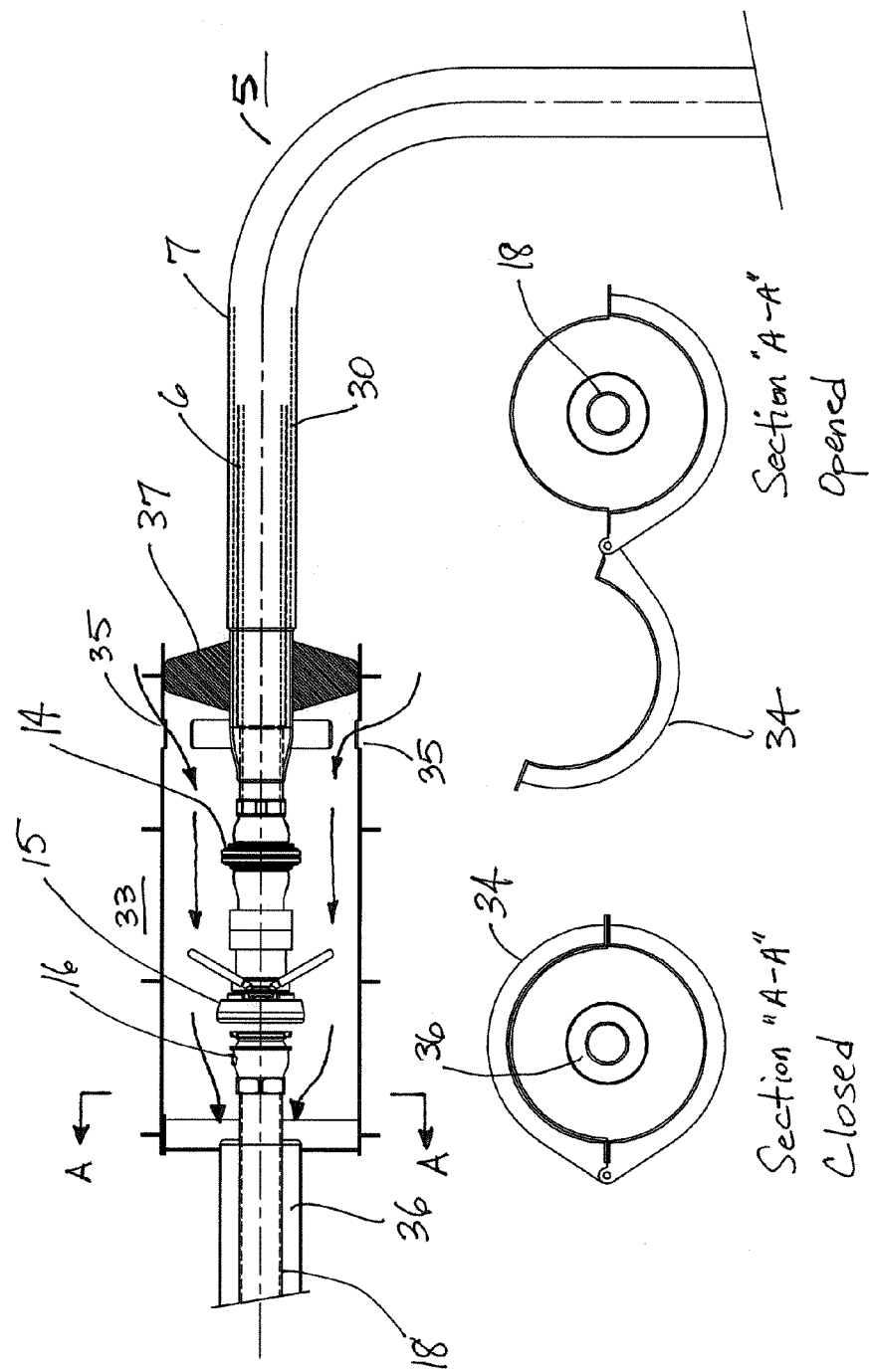
FIG. 5 shows yet another embodiment in accordance with the present invention.

FIG. 5 shows an alternative to the embodiment shown in FIG. 4. In the embodiment shown in FIG. 5, a containment unit 33 is fitted closely around the emergency breakaway coupling 14, the quick connect/disconnect assembly 15, and the mating connection 16. In a preferred embodiment, a cover 34 of the containment unit 33 can be opened to provide access to the couplings underneath (i.e., the emergency breakaway coupling 14, the quick connect/disconnect connector 15, and the mating connection 16) so as not to interfere or inhibit the emergency disconnection of the fuel gas transfer assembly 5. This result can be accomplished by any number of means, including but not limited to attaching the cover 34 to the containment unit 33 with a hinge or similar means. Containment unit 33 also includes vent openings 35 which allow air to flow through the containment unit 33 in the direction indicated by the arrows shown in FIG. 5.

In operation, due to the close fit of the containment unit 33 around the emergency breakaway coupling 14, the quick connect/disconnect assembly 15, and the mating connection 16, the air flowing through the vent openings 35 directs any leakage of natural gas within the containment unit 33 into a vented space 36 between the inner and outer walls of the double-wall gas pipe 18 which goes to the engine room of the tugboat 2. Consequently, since the vented space 36 typically has a gas detector (not shown) disposed therein, it is less likely that a natural gas leak from the emergency breakaway coupling 14, the quick connect/disconnect assembly 15, and/or the mating connection 16 would go undetected.

Containment unit 33 further includes a support block 37 which surrounds and supports the fuel gas transfer assembly 5. In an advantageous aspect of the present embodiment, the support block 37 enables a cleaner breakaway of the fuel gas transfer assembly 5 from the barge 1 in the event of an emergency separation, since the movement of the fuel gas transfer assembly 5 as it exits the containment unit 33 will be constrained by the surrounding support block 37.

Figure 6:
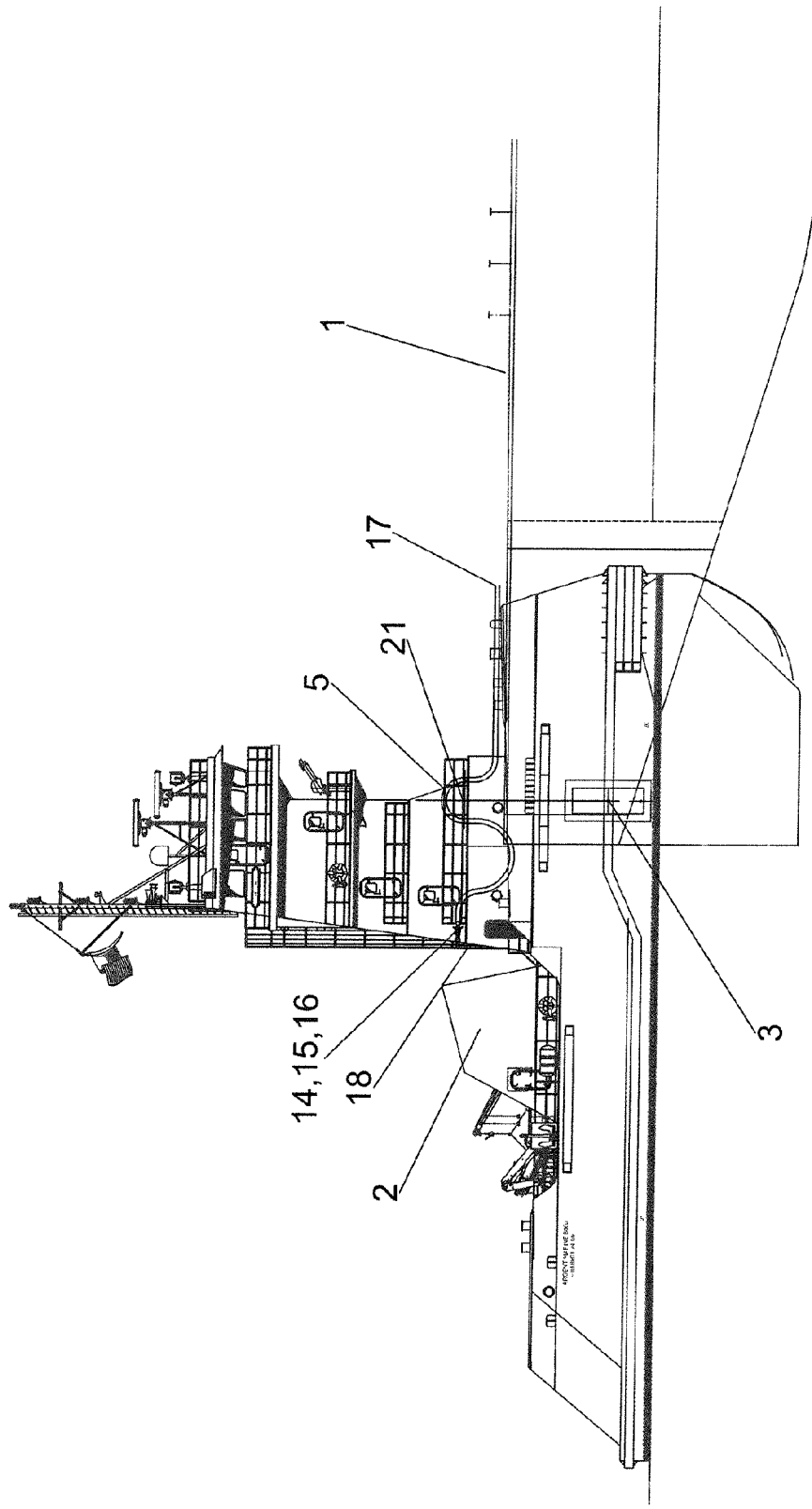
FIG. 6 shows an embodiment in accordance with the present invention used in connection with an AT/B vessel in which the tug is pitched at zero degrees in relation to the level trim of the barge.
Figure 6A:
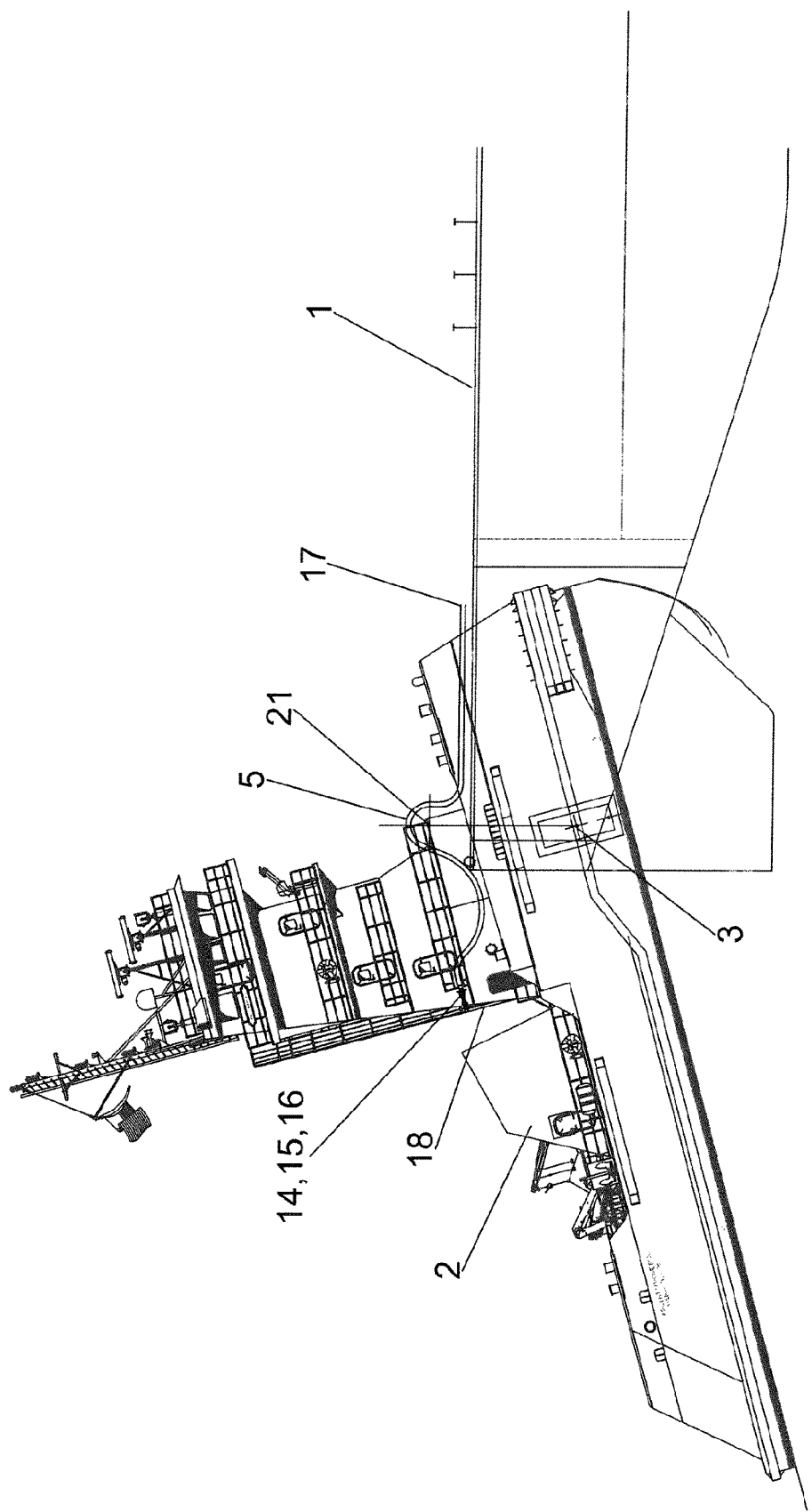
FIG. 6A shows an embodiment in accordance with the present invention used in connection with an AT/B vessel in which the tug is pitched at an extreme aft pitch in relation to the level trim of the barge.
Figure 6B:
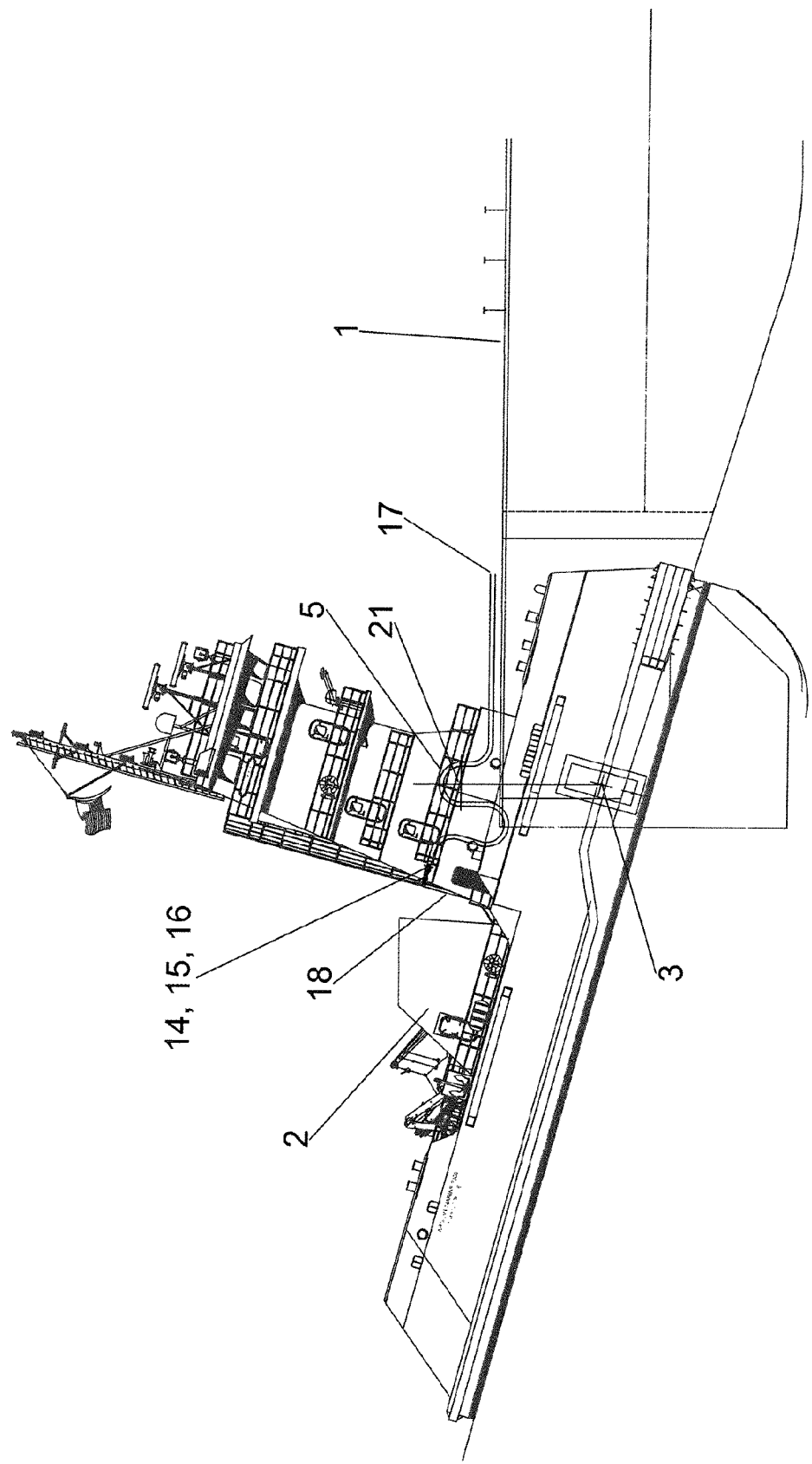
FIG. 6B shows an embodiment in accordance with the present invention used in connection with an AT/B vessel in which the tug is pitched at an extreme forward pitch in relation to the level trim of the barge.

FIGS. 6, 6A, and 6B illustrate an embodiment in accordance with the present invention in which the fuel gas transfer assembly 5 is used in an AT/B LNGC of the type shown in FIGS. 1 and 2. As shown in FIG. 6, an AT/B tugboat 2 is coupled to a barge 1 using an AT/B coupler connection, where the reference numeral 3 refers to both the AT/B coupler connection and to the pivot center of the coupling connection. In accordance with an embodiment of the present invention, the fuel gas transfer assembly 5 is flexible and can thus flex within its allowable limits. The fuel gas transfer assembly 5 is supported by a fixed radius saddle 21 to ensure that the minimum allowable bend radius of the fuel gas transfer assembly 5 is not violated.

FIG. 6 specifically illustrates the implementation of the fuel gas transfer assembly 5 that is illustrated in FIG. 4, wherein the emergency breakaway coupling 14 is located adjacent to the quick connect/disconnect connector 15 and the mating connection 16 on the tugboat 2. This should not be considered limiting in any way, as the arrangement illustrated in FIG. 3 could alternatively be employed. Although omitted from FIG. 6 for the sake of clarity, it will be understood that the partial shield 19 and the gas detector 20 can be used with the emergency breakaway coupling 14, the quick connect/disconnect connector 15, and the mating connection 16 in the manner shown in FIG. 4. Likewise, the containment unit 33 can be used with the emergency breakaway coupling 14, the quick connect/disconnect connector 15, and the mating connection 16 in the manner shown in FIG. 5. In addition, FIG. 6 (as well as FIGS. 6A and 6B that follow) does not show a termination for the supply source 17 on the barge 1, since it is to be understood that the supply source 17 terminates wherever the LNG fuel happens to be located on the barge.

FIG. 6A illustrates the embodiment shown in FIG. 6, with the tugboat 2 pitched at five degrees aft in relation to the level trim of the barge 1. This represents a typical extreme aft pitch of the tugboat 2, which can occur as a result of normal at-sea movement of the tugboat 2 relative to the barge 1 in pitch due to the effect of ocean wave conditions, and illustrates the ability of the fuel gas transfer assembly 5 to accommodate the movement between the tugboat 2 and the barge 1.

FIG. 6B illustrates the embodiment shown in FIG. 6, with the tugboat 2 pitched at five degrees forward in relation to the level trim of the barge 1. This represents a typical extreme forward pitch of the tugboat 2, which can occur as a result of normal at-sea movement of the tugboat 2 relative to the barge 1 in pitch due to the effect of ocean wave conditions, and illustrates the ability of the fuel gas transfer assembly 5 to accommodate the movement between the tugboat 2 and the barge 1.

Figure 7:
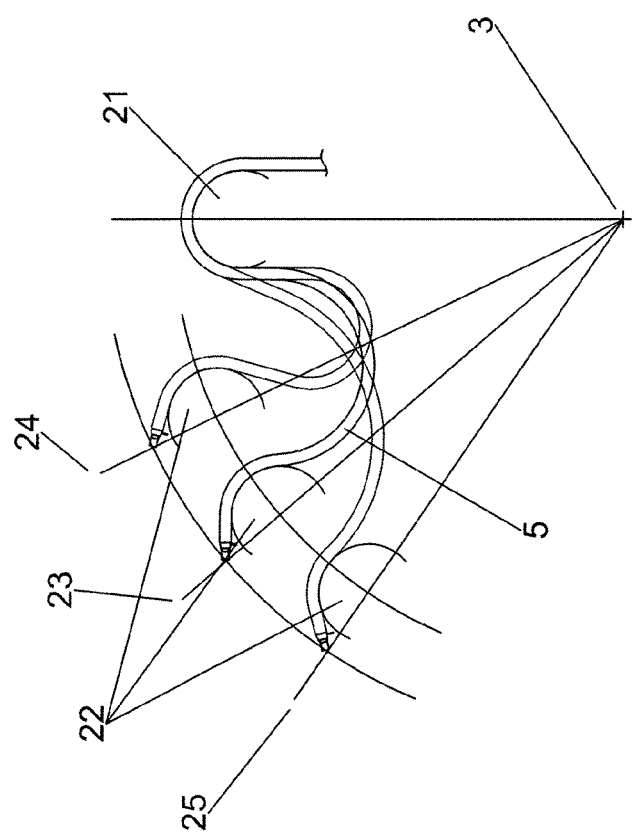
FIG. 7 shows detail of the limits of motion of a natural gas flexible hose in accordance with the present invention.

FIG. 7 is a composite view of the fuel gas transfer assembly 5 showing the extreme limits of its movement due to the pitching of the tugboat 2 relative to the barge 1. Reference numeral 3 indicates the center of rotation of the AT/B coupler in pitch (see FIGS. 6, 6A, and 6B). The fuel gas transfer assembly 5 is supported by the fixed radius saddle 21, which is fitted on the barge 1 to ensure that the minimum allowable bend radius of the fuel gas transfer assembly 5 is not violated. A similar fixed radius hose saddle 22 is fitted on the tugboat 2, also to ensure that the minimum allowable bend radius of the fuel gas transfer assembly 5 is not violated. The extreme forward pitch of the tugboat 2 relative to the barge 1 is indicated by position 24. The extreme aft pitch of the tugboat 2 relative to the barge 1 is indicated by position 25. The zero pitch of the tugboat 2 relative to the barge 1 is indicated by position 23.

Figure 8:
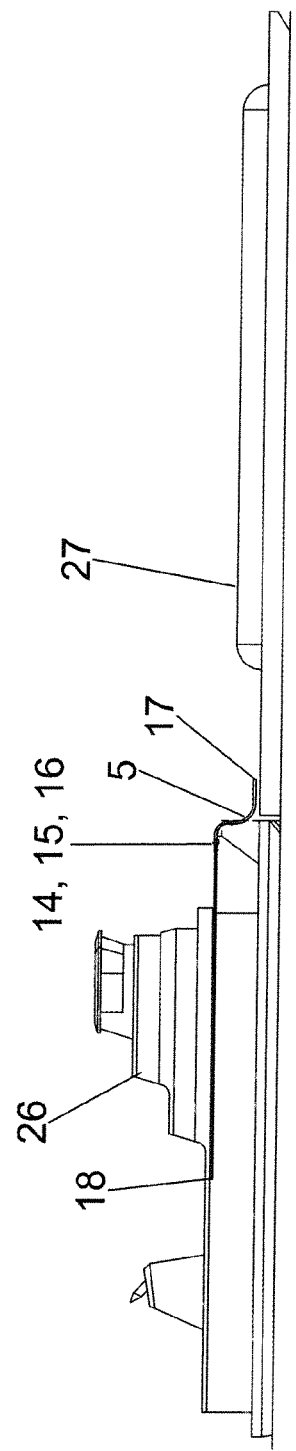
FIG. 8 shows an exemplary embodiment in accordance with the present invention in the context of an arrangement of an inland towboat and a natural gas fuel barge.

FIG. 8 illustrates a towboat 26 (i.e., an inland river push-mode tugboat) that pushes an LNG fuel barge 27 as part of a flotilla of cargo barges of various types, in accordance with another embodiment of the present invention. As shown in FIG. 8, natural gas fuel is transferred from the LNG fuel barge 27 to the towboat 26 in the manner described hereinabove, wherein the fuel gas transfer assembly 5, the natural gas supply line 17 from the natural gas supply on the barge 27, the natural gas supply line 18 to the natural gas-fueled engines on the towboat 26, the emergency breakaway connector 14, the quick connect/disconnect connector 15, and the mating connection 16 are fitted on the towboat 26 and the barge 27 in the manner illustrated and described hereinabove.

Figure 9:
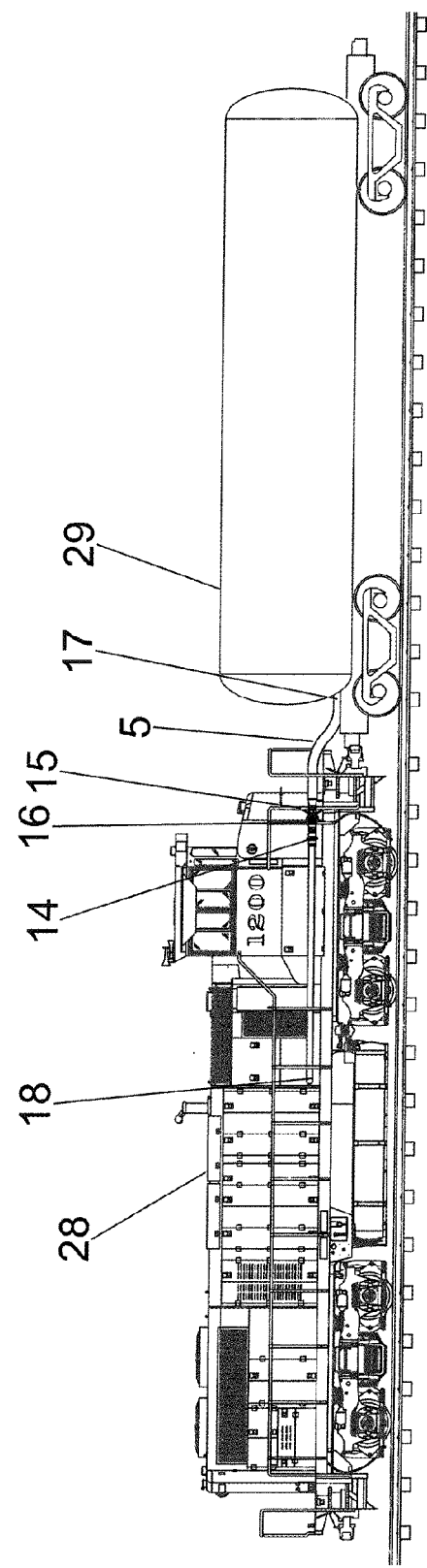
FIG. 9 shows another exemplary embodiment in accordance with the present invention in the context of an arrangement of a railroad locomotive and a natural gas fuel tender car.

FIG. 9 illustrates another embodiment in accordance with the present invention, in which a railroad locomotive is powered by ambient temperature natural gas fuel (e.g., LNG boil off) that is provided from a tender car 29. As shown in FIG. 9, natural gas fuel is transferred from the tender car 29 to the locomotive 28 in the manner described hereinabove, wherein the fuel gas transfer assembly 5, the natural gas supply line 17 from the natural gas supply on the tender car 29, the natural gas supply line 18 to the natural gas-fueled engines on the locomotive 28, the emergency breakaway connector 14, the quick connect/disconnect connector 15, and the mating connection 16 are fitted on the locomotive 28 and the tender car 29 in the manner illustrated and described hereinabove.

Figure 10:
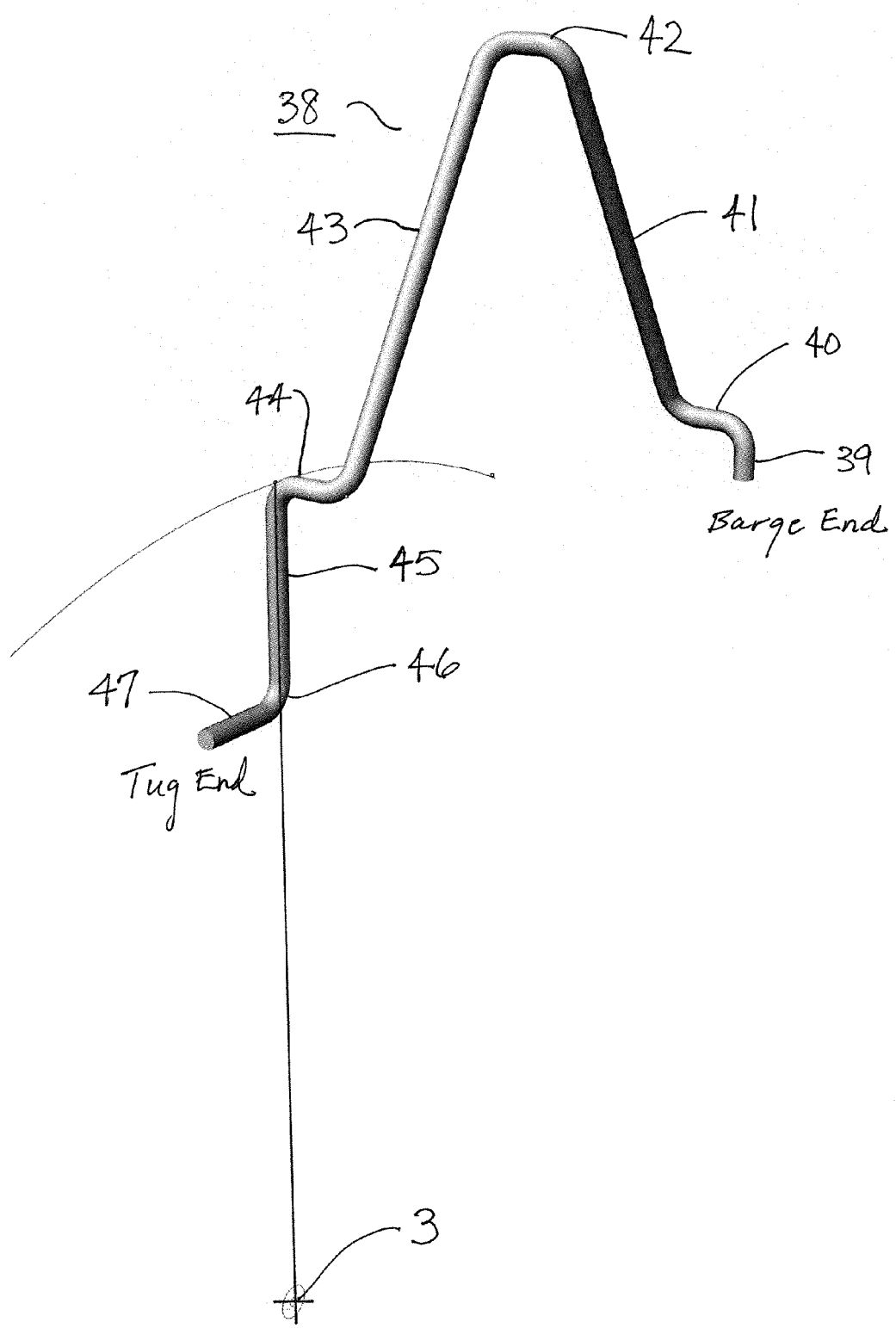
FIG. 10 shows a fuel gas transfer pipe in accordance with the present invention.

In alternative embodiments in accordance with the present invention, an articulated fuel gas transfer pipe can replace the fuel gas transfer assembly 5 in the foregoing embodiments. As shown in FIG. 10, an exemplary fuel gas transfer pipe 38 has several pipe segments 39, 41, 43, 45, 47 which are interconnected by swivel joints 40, 42, 44, 46. In preferred embodiments, the pipe segments of fuel gas transfer pipe 38 are rigid, and thus the fuel gas transfer pipe 38 is a rigid pipe between the swivel joints. In further preferred embodiments, the swivel joints of fuel gas transfer pipe 38 are double sealed. The space (not shown) between the inner seal, which primarily seals in the natural gas, and the outer seal is filled with nitrogen or other inert gas and is maintained at a pressure above the pressure of the natural gas contained within the gas transfer pipe 38. The nitrogen pressure is monitored in the same fashion as is shown in FIG. 4, such that any leakage of the seals is immediately detected and the transfer of natural gas is shutdown.

In an exemplary embodiment, the fuel gas transfer pipe 38 is used in an AT/B LNGC of the type shown in FIGS. 1 and 2. Referring to FIG. 6, an AT/B tugboat 2 is coupled to a barge 1 using an AT/B coupler connection, where the reference numeral 3 refers to both the AT/B coupler connection and to the pivot center of the coupling connection. In accordance with an aspect of the present invention, the swivel joints 40, 42, 44, 4 provide the fuel gas transfer pipe 38 with flexibility so that it can flex within its allowable limits when coupled between the barge 1 and tugboat 2.

Figure 11:
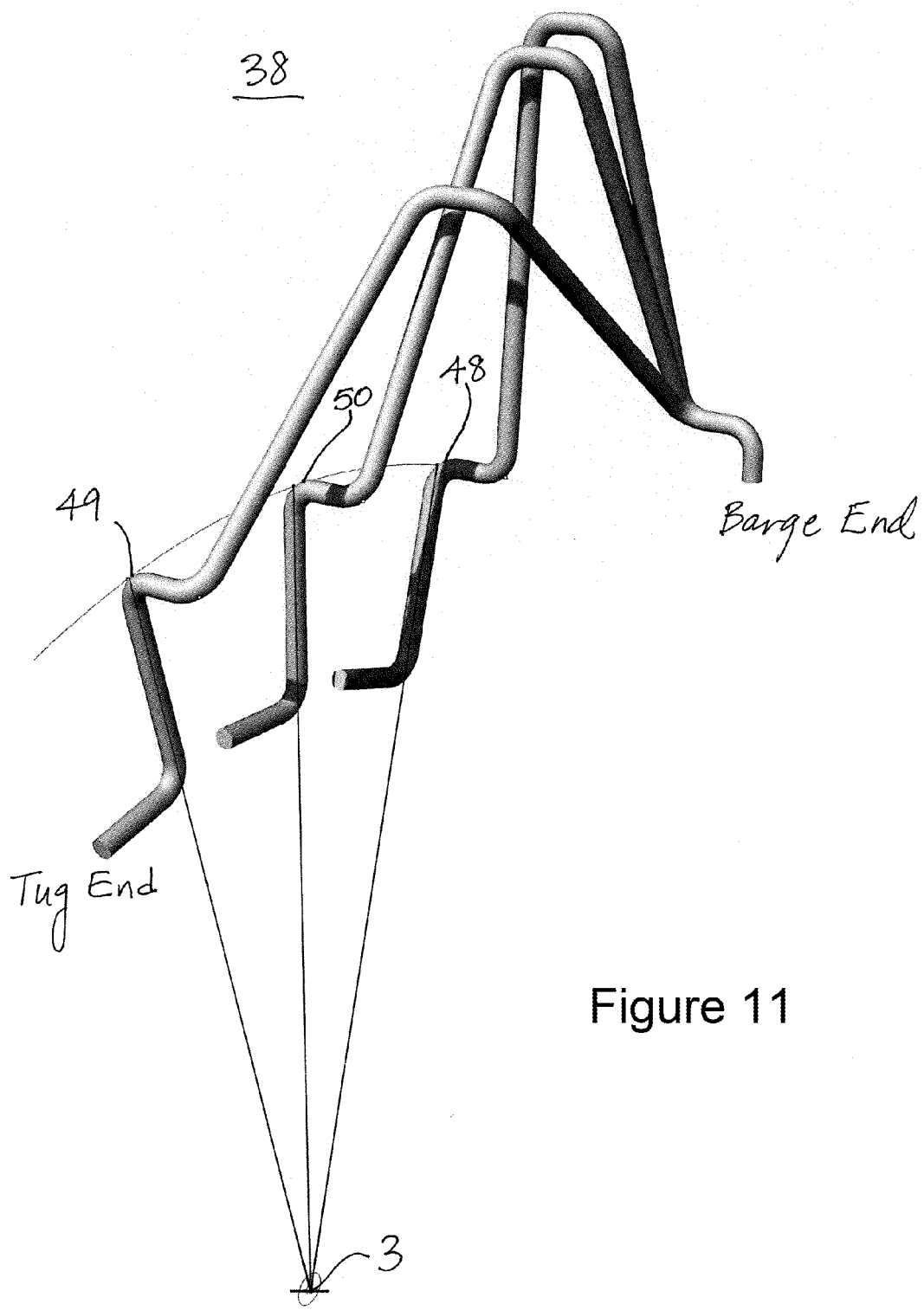
FIG. 11 shows detail of the limits of motion of a fuel gas transfer pipe in accordance with the present invention.

FIG. 11 is a composite view of the fuel gas transfer assembly 38 showing the extreme limits of its range of motion due to the pitching of the tugboat 2 relative to the barge 1. Reference numeral 3 indicates the center of rotation of the AT/B coupler in pitch (see FIGS. 6, 6A, and 6B). The extreme forward pitch of the tugboat 2 relative to the barge 1 is indicated by position 48. The extreme aft pitch of the tugboat 2 relative to the barge 1 is indicated by position 49. The zero pitch of the tugboat 2 relative to the barge 1 is indicated by position 50.

While this invention has been described in conjunction with exemplary embodiments outlined above and illustrated in the drawings, it is evident that many alternatives, modifications and variations will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification. Without limiting the generality of the foregoing, those skilled in the art will appreciate that the embodiments in accordance with the present invention are not limited to the transfer of LNG and include and encompass the transfer of other cryogenic liquid gases.

What is claimed is:

1. A system for transferring natural gas, the system comprising:
   a barge;
   a tugboat positioned within a notch of the barge and coupled to the barge with a pin connection to push the barge, wherein a relative pitch motion between the tugboat and the barge spans a range of +5 to −5 degrees of relative pitch;
   an articulated pipe having a first end through which natural gas is transferred from the barge and a second end; and
   at least one coupling coupled to the second end of the articulated pipe and through which the natural gas is transferred to the tugboat.

2. The system of claim 1, wherein the articulated pipe comprises a plurality of pipe segments interconnected by at least one swivel joint.

3. The system of claim 2, wherein each one of said plurality of pipe segments is rigid.

4. The system of claim 2, wherein the at least one swivel joint has at least one seal.

5. The system of claim 4, wherein the at least one swivel joint comprises an inner seal and an outer seal.

6. The system of claim 5, wherein the inner seal seals the natural gas in the swivel joint.

7. The system of claim 5, wherein a space between the inner seal and the outer seal is filled with a gas that will not support combustion.

8. The system of claim 7, wherein the gas that will not support combustion comprises an inert gas.

9. The system of claim 8, wherein the inert gas comprises nitrogen.

10. The system of claim 7, further comprising:
    a supply line through which the gas that will not support combustion is supplied to the space between the inner seal and the outer seal; and
    a pressure switch that monitors the pressure of the gas that will not support combustion in the supply line.

11. The system of claim 10, wherein the pressure switch closes when the pressure of the gas that will not support combustion in the supply line drops.

12. The system of claim 11, further comprising an alarm system coupled to the pressure switch.

13. The system of claim 12, wherein the closing of the pressure switch causes an alarm to be triggered.

14. The system of claim 13, further comprising a shutdown system coupled to the pressure switch.

15. The system of claim 14, wherein the closing of the pressure switch causes the shutdown system to shut down the supply of the natural gas to the articulated pipe.

16. The system of claim 7, wherein a space between the inner seal and the outer seal is at a pressure that is greater than the pressure of the natural gas within the articulated pipe.

17. The system of claim 1, wherein the at least one coupling comprises a self-sealing breakaway connection through which the second end of the articulated pipe is coupled to the tugboat, wherein the breakaway connection automatically breaks upon application of an excessive load without releasing the natural gas from the articulated pipe.

18. The system of claim 1, wherein the at least one coupling comprises a self-sealing connection through which the articulated pipe is coupled to the tugboat, such that the articulated pipe can be intentionally disconnected without releasing natural gas.

19. The system of claim 1, wherein the barge comprises a non-self-propelled LNG carrier.

20. A system for transferring natural gas, the system comprising:
 a barge;
 a tugboat positioned within a notch of the barge and coupled to the barge with a pin connection to push the barge, wherein a relative pitch motion between the tugboat and the barge spans a range of +5 to −5 degrees of relative pitch;
 an articulated pipe through which natural gas is transferred from the barge to the tugboat;
 at least one coupling through which the natural gas is transferred from the articulated pipe to the tugboat; and
 a containment unit disposed around the at least one coupling to contain a leak of the natural gas from the at least one coupling.

21. The system of claim 20, wherein the containment unit is fitted closely around the at least one coupling.

22. The system of claim 20, wherein the containment unit has at least one opening through which air can flow.

23. The system of claim 22, wherein air flows within the containment unit in a direction from the barge to the tugboat.

24. The system of claim 23, wherein the air flow directs natural gas leakage from the at least one coupling toward the tugboat.

25. The system of claim 20, wherein the containment unit comprises a support block disposed around the articulated pipe.

26. An articulated conduit system for transferring fluid between two vessels, the system comprising:
 a plurality of rigid conduits interconnected by at least four swivel joints that are configured to permit positional alterations of the conduits that result from relative pitch motion between a first vessel and a second vessel, wherein the system is configured to be secured at a first end on the first vessel and at a second end on the second vessel, and the relative pitch motion spans a range of +5 to −5 degrees of relative pitch.

27. The articulated conduit system of claim 26, wherein the first and second vessels are a tugboat and a barge.

28. The articulated conduit system of claim 27, wherein the tugboat and the barge are configured as an articulated tugboat and barge, wherein the tugboat is configured to push the barge through a pin connection.

29. The articulated conduit system of claim 26, wherein each of the at least four swivel joints is configured to provide a gas-tight seal.

30. The articulated conduit system of claim 26, wherein each of the at least four swivel joints is configured to provide a gas-tight seal for containing a gas within the conduit system with a pressure that is greater than a pressure of the gas contained within the conduit system.

31. The articulated conduit system of claim 26, having four swivel joints.

32. The articulated conduit system of claim 27, comprising at least one swivel joint rotatable about a transverse axis relative to the tugboat and the barge to accommodate pitch motion between the tugboat and the barge.

33. The articulated conduit system of claim 27, comprising at least three swivel joints rotatable about longitudinal or transverse axes relative to the tugboat and the barge, wherein the at least three swivel joints are rotatable together to accommodate displacement in a vertical direction relative to the tugboat and the barge.

34. The articulated conduit system of claim 27, comprising at least one swivel joint rotatable about a vertical axis relative to the tugboat and the barge to accommodate pitch motion between the tugboat and the barge.

35. The articulated conduit system of claim 26, wherein the plurality of conduits comprise pipe segments.

36. The articulated conduit system of claim 26, wherein the first vessel is a tugboat having a natural gas fuel system and the conduit system is in fluid communication with a supply pipe for the natural gas fuel system.

37. The articulated conduit system of claim 36, wherein the second vessel is a barge having a supply of natural gas and the conduit system is in fluid communication with the supply of natural gas.

* * * * *